US012729328B2

(12) United States Patent
Jung et al.

(10) Patent No.: US 12,729,328 B2
(45) Date of Patent: Sep. 8, 2026

(54) CURABLE PRECURSOR OF A STRUCTURAL ADHESIVE COMPOSITION

(71) Applicant: 3M INNOVATIVE PROPERTIES COMPANY, St. Paul, MN (US)

(72) Inventors: Adrian T. Jung, Kaarst (DE); Boris Ove Alexander Tasch, Düsseldorf (DE); Elisabeth Cura, Düsseldorf (DE); Eike H. Klünker, Kaarst (DE); Peter Bissinger, Diessen (DE); Wolf Steiger, Weil-Petzenhausen (DE); Dirk Hasenberg, Raeren (BE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 747 days.

(21) Appl. No.: 17/927,325

(22) PCT Filed: May 21, 2021

(86) PCT No.: PCT/IB2021/054442

§ 371 (c)(1),
(2) Date: Nov. 22, 2022

(87) PCT Pub. No.: WO2021/240328

PCT Pub. Date: Dec. 2, 2021

(65) Prior Publication Data

US 2023/0235204 A1 Jul. 27, 2023

(30) Foreign Application Priority Data

May 25, 2020 (EP) .................................... 20176290

(51) Int. Cl.
*C09J 163/00* (2006.01)
*C08G 59/56* (2006.01)
*C09J 7/35* (2018.01)

(52) U.S. Cl.
CPC .................................. *C09J 163/00* (2013.01)

(58) Field of Classification Search
CPC ... C09J 7/30; C09J 7/35; C09J 163/00; C08G 59/40; C08G 59/4021
USPC .......................................... 156/330; 525/529
See application file for complete search history.

(56) References Cited

U.S. PATENT DOCUMENTS 4,605,465 A 8/1986 Morgan
4,612,209 A * 9/1986 Forgo .................... C08F 283/10 427/386
4,859,750 A * 8/1989 Kato ..................... C08F 265/06 526/135
5,453,450 A 9/1995 Kinzer et al.
6,000,118 A 12/1999 Biernat et al.
6,214,460 B1 * 4/2001 Bluem ....................... C09J 7/35 428/355 EP
6,368,008 B1 4/2002 Biernat et al.
6,528,176 B1 3/2003 Asai et al.
7,592,540 B2 9/2009 Park et al.
9,192,990 B2 11/2015 Meyer et al.
9,278,370 B2 3/2016 Maccormack et al.
9,469,057 B2 10/2016 Johnson et al.
9,707,727 B2 7/2017 Darland
9,944,059 B2 4/2018 Morral et al.
9,976,063 B2 5/2018 Childers et al.
9,987,807 B2 6/2018 Harrier
10,004,292 B2 6/2018 Darland
10,029,461 B2 7/2018 Yamada
10,060,042 B2 8/2018 Tsotsis
10,125,223 B2 11/2018 Ciceron et al.
10,183,332 B2 1/2019 Hirata et al.
10,221,280 B2 3/2019 Monnier et al.
10,246,540 B2 4/2019 Sun
10,305,050 B2 5/2019 Xu
10,307,976 B2 6/2019 Harrier et al.
10,336,919 B2 7/2019 Shim et al.
10,344,194 B2 7/2019 Naik
10,421,887 B2 9/2019 Kim et al.
10,577,453 B2 3/2020 Ciceron et al.
10,596,796 B2 3/2020 Hase et al.
10,662,263 B2 5/2020 Schmidt et al.
10,676,561 B2 6/2020 Hirata et al.
10,767,071 B2 9/2020 Osaka et al.
10,786,945 B2 9/2020 Ederer et al.
10,893,616 B2 1/2021 Onozeki et al.
(Continued)

FOREIGN PATENT DOCUMENTS

CN 104673151 A 6/2015
CN 105778829 A 7/2016
CN 106147279 A 11/2016
CN 106243278 A 12/2016
CN 106278175 A 1/2017
CN 107189047 A 9/2017
CN 107245314 A 10/2017
CN 107325770 A 11/2017
CN 105400436 B 1/2018
CN 107698952 A 2/2018
CN 107722909 A 2/2018
(Continued)

OTHER PUBLICATIONS

Extended European Search Report received for EP Application No. 20176290.3, mailed on Oct. 2, 2020, 3 pages.
(Continued)

*Primary Examiner* — Michael J Feely
(74) *Attorney, Agent, or Firm* — Kathleen B. Gross

(57) ABSTRACT

The present disclosure relates to a curable precursor of a structural adhesive composition, comprising: a thermally curable resin; a thermal curing initiator for the thermally curable resin; a radiation self-polymerizable multi-functional compound comprising a polyether oligomeric backbone and at least one free-radical (co)polymerizable reactive group at each terminal position of the oligomer backbone; and a free-radical polymerization initiator for the radiation self-polymerizable multi-functional compound.

17 Claims, No Drawings

(56) References Cited

U.S. PATENT DOCUMENTS 10,899,885 B2 1/2021 Joy et al.
10,941,233 B2 3/2021 Highgate
10,941,376 B2 3/2021 Fujimoto et al.
11,028,204 B2 6/2021 Jain et al.
11,066,579 B2 7/2021 Oikawa et al.
11,254,841 B2 2/2022 Franke et al.
11,267,944 B2 3/2022 Liu et al.
11,279,853 B2 3/2022 Franke et al.
11,319,468 B2 5/2022 Lee et al.
11,377,576 B2 7/2022 Cura et al.
11,396,491 B2 7/2022 Monnier et al.
11,534,828 B2 12/2022 Czinger et al.
11,597,856 B2 3/2023 Franke et al.
11,602,888 B2 3/2023 Franke et al.
11,680,039 B2 6/2023 He et al.
11,845,885 B2 12/2023 Schmid et al.
11,879,078 B2 1/2024 Jung et al.
12,018,114 B2 6/2024 White et al.
12,203,017 B2 1/2025 Jung et al.
12,276,629 B2 4/2025 Münstermann et al.
12,410,346 B2 9/2025 Cura et al.
2009/0155597 A1 6/2009 Kropp et al.
2010/0120936 A1 5/2010 Lamon
2013/0310507 A1 11/2013 Tummala et al.
2014/0045964 A1 2/2014 Marchegiani et al.
2015/0126670 A1 5/2015 Tummala et al.
2015/0240136 A1 8/2015 Elgimiabi et al.
2015/0322309 A1* 11/2015 Hu ........................ C08G 59/40
427/553
2016/0220995 A1 8/2016 Atashbar et al.
2016/0312080 A1 10/2016 Richter et al.
2017/0022311 A1 1/2017 Liu et al.
2017/0036403 A1 2/2017 Ruff et al.
2017/0320128 A1 11/2017 Deters et al.
2018/0036766 A1 2/2018 Vidal et al.
2018/0127625 A1 5/2018 Shafer et al.
2018/0134919 A1 5/2018 Greve
2018/0154575 A1 6/2018 Hortelano et al.
2018/0258329 A1 9/2018 Koch et al.
2018/0297277 A1 10/2018 Yoshikawa et al.
2018/0305497 A1 10/2018 Childers et al.
2018/0339453 A1 11/2018 Dinunzio
2018/0350274 A1 12/2018 Ruan
2019/0002711 A1 1/2019 Son et al.
2019/0055420 A1 2/2019 Beyer et al.
2019/0085113 A1 3/2019 Inoubli et al.
2019/0092978 A1 3/2019 Ogino et al.
2019/0144718 A1 5/2019 Aizawa
2021/0108014 A9 4/2021 Sun
2021/0179893 A1 6/2021 Ogino et al.
2021/0317258 A1 10/2021 White et al.
2021/0324250 A1 10/2021 White et al.
2022/0153987 A1 5/2022 Tong et al.
2022/0162376 A1 5/2022 Yao et al.
2022/0213364 A1 7/2022 Tasch et al.
2022/0243102 A1 8/2022 Shaaban et al.
2023/0407148 A1* 12/2023 Tasch ................... C08F 283/10

FOREIGN PATENT DOCUMENTS

CN 108047729 A 5/2018
CN 108099185 A 6/2018
CN 108249895 A 7/2018
CN 108384494 A 8/2018
CN 108384501 A 8/2018
CN 106565127 B 1/2019
CN 109111894 A 1/2019
CN 109135627 A 1/2019
CN 108178994 B 2/2019
CN 109320666 A 2/2019
CN 105694791 B 4/2019
EP 2886620 A1 6/2015
EP 2957577 A1 12/2015
EP 3170860 A1 5/2017
EP 3290185 A1 3/2018
EP 3347394 A0 7/2018
GB 2527492 A 12/2015
JP 2015151453 A 8/2015
JP 2018196971 A 12/2018
KR 20170111259 A 10/2017
TW 201905131 A 2/2019
WO 1994029399 A1 12/1994
WO 2009079216 A1 6/2009
WO 2015002781 A2 1/2015
WO 2017117163 A1 7/2017
WO 2017219619 A1 12/2017
WO 2019119559 A1 6/2019
WO 2019132212 A1 7/2019

OTHER PUBLICATIONS

International Search Report received for PCT International Application No. PCT/IB2021/054442, mailed on Jun. 15, 2021, 6 pages.

* cited by examiner

CURABLE PRECURSOR OF A STRUCTURAL ADHESIVE COMPOSITION

CROSS REFERENCE TO RELATED APPLICATIONS

This application is a national stage filing under 35 U.S.C. 371 of PCT/IB2021/054442, filed May 21, 2021, which claims the benefit of EP Application No. 20176290.3, filed May 25, 2020, the disclosure of which is incorporated by reference in its entirety herein.

TECHNICAL FIELD

The present disclosure relates generally to the field of adhesives, more specifically to the field of structural adhesive compositions and films for use in particular for bonding metal parts. More specifically, the present disclosure relates to a curable precursor of a structural adhesive composition and to a partially cured precursor composition. The present disclosure also relates to a method of bonding two parts and to a composite article. The present disclosure is further directed to the use of a curable precursor of a structural adhesive composition for construction and automotive applications, in particular for body-in-white bonding applications in the automotive industry.

BACKGROUND

Adhesives have been used for a variety of holding, sealing, protecting, marking and masking purposes. One type of adhesive which is particularly preferred for many applications is represented by structural adhesives. Structural adhesives are typically thermosetting resin compositions that may be used to replace or augment conventional joining techniques such as screws, bolts, nails, staples, rivets and metal fusion processes (e.g. welding, brazing and soldering). Structural adhesives are used in a variety of applications that include general-use industrial applications, as well as high-performance applications in the automotive and aerospace industries. To be suitable as structural adhesives, the adhesives shall exhibit high and durable mechanical strength as well as high impact resistance.

Structural adhesives may, in particular, be used for metal joints in vehicles. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide sufficient corrosion resistance. For example, U.S. Pat. No. 6,000,118 (Biemat et al.) discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 (Biernat et al.) discloses the use of an adhesive for securing two metal panels together. The edge of the joint is further sealed by a metal coating. WO 2009/071269 (Morral et al.) discloses an expandable epoxy paste adhesive as a sealant for a hem flange. A further hemmed structure is disclosed in U.S. Pat. No. 6,528,176 (Asai et al.). Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. WO 2007/014039 (Lamon), which discloses a thermally expandable and curable epoxy-based precursor of an expanded thermoset film toughened foamed film comprising a mixture of solid and liquid epoxy resins, and which is claimed to provide both favorable energy absorbing properties and gap filling properties upon curing. Other partial solutions have been described in EP-A1-2 700 683 (Elgimiabi et al.) and in WO 2017/197087 (Aizawa) which disclose structural adhesive films suitable for forming a hem flange structure. Structural adhesive films or tapes typically suffer from lack of elasticity and insufficient tackiness which makes them only partially suitable for hem flange bonding. Further partial solutions have been described in US-A1-2018/0127625 (Shafer et al.) which discloses a so-called structural bonding tape. Structural bonding tapes are generally suboptimal in terms of performance attributes such as e.g. adhesive strength, stability and corrosion resistance.

Without contesting the technical advantages associated with the solutions known in the art, there is still a need for a structural adhesive composition which would overcome the above-mentioned deficiencies.

SUMMARY

According to one aspect, the present disclosure relates to a curable precursor of a structural adhesive composition, comprising:

a) a thermally curable resin;
b) a thermal curing initiator for the thermally curable resin;
c) a radiation self-polymerizable multi-functional compound comprising a polyether oligomeric backbone and at least one free-radical (co)polymerizable reactive group at each terminal position of the oligomer backbone; and
d) a free-radical polymerization initiator for the radiation self-polymerizable multi-functional compound.

According to another aspect, the present disclosure is directed to a partially cured precursor of a structural adhesive composition, comprising:

a) a polymeric material comprising the self-polymerization reaction product of a polymerizable material comprising a radiation self-polymerizable multi-functional compound;
b) optionally, some residual free-radical polymerization initiator for the radiation self-polymerizable multi-functional compound;
c) a thermally curable resin; and
d) a thermal curing initiator for the thermally curable resin; and wherein the thermally curable resin(s) are (substantially) uncured.

In still another aspect of the present disclosure, it is provided a method of bonding two parts, which comprises the steps of:

a) applying a curable precursor or a partially cured precursor as described above to a surface of at least one of the two parts;

b) joining the two parts so that the curable precursor or the partially cured precursor (hybrid) structural adhesive composition is positioned between the two parts; and c) optionally, partially curing the curable precursor according of step a) by initiating the free-radical polymerization initiator for the radiation self-polymerizable multi-functional compound, thereby forming a partially cured precursor comprising a polymeric material resulting from the self-polymerization reaction product of the radiation self-polymerizable multi-functional compound; and/or d) substantially fully curing the partially cured precursor of step a) or c) by initiating the thermal curing initiator for the thermally curable resin, thereby obtaining a substantially fully cured (hybrid) structural adhesive composition and bonding the two parts.

According to yet another aspect, the present disclosure relates to the use of a curable precursor or a partially cured precursor as described above, for industrial applications, in particular for construction and automotive applications.

DETAILED DESCRIPTION

According to a first aspect, the present disclosure relates to a (hybrid) curable precursor of a structural adhesive composition, comprising:

a) a thermally curable resin;

b) a thermal curing initiator for the thermally curable resin;

c) a radiation self-polymerizable multi-functional compound comprising a polyether oligomeric backbone and at least one free-radical (co)polymerizable reactive group at each terminal position of the oligomer backbone; and d) a free-radical polymerization initiator for the radiation self-polymerizable multi-functional compound.

In the context of the present disclosure, it has been surprisingly found that a curable precursor as described above is particularly suitable for manufacturing structural adhesive compositions provided with excellent characteristics and performance as to elasticity, tackiness, cold-flow, flexibility, handling properties and surface wetting in their uncured (or pre-cured) state, as well as to adhesive strength, ageing stability and corrosion resistance in their fully cured state. The curable precursor of a structural adhesive composition as described above have been surprisingly found to combine most of the advantageous characteristics of both the structural adhesive films and the structural bonding tapes known in the art, without exhibiting their known deficiencies.

It has further been discovered that, in some executions, the curable precursor as described above is provided with advantageous thixotropic properties, which makes it particularly suitable for the manufacture of multi-dimensional structural adhesive articles and objects, in particular via suitable printing techniques.

It has still surprisingly been found that the curable precursor as described above is particularly suitable for the manufacture of one-part curable precursors of structural adhesive compositions due to its outstanding chemical stability, and in spite of the dissimilar chemical nature of the hybrid curing system employed. One-part curable precursors are advantageous over two-part curable precursor compositions in that they do not require any specific delayed mixing steps or associated equipment, and typically provide more processing flexibility.

It has yet surprisingly been discovered that, in some executions, the curable precursor as described above is suitable for manufacturing structural adhesive compositions provided with excellent characteristics and performance as to adhesion to oily contaminated substrates, such as stainless steel and aluminum.

Without wishing to be bound by theory, it is believed that these excellent characteristics are due in particular to the presence of a specific hybrid curing system in the curable precursor involving both: a) a thermally-induced curing of a thermally curable resin, and b) a radiation-induced self-polymerization of a multi-functional compound as specified above. Still without wishing to be bound by theory, it is believed that this dual/hybrid curing system involving two independent reactive systems, which have a different chemical nature and which co-exist in the curable precursor without interfering with each other, has the ability to form—upon complete curing—an interpenetrating network involving a polymeric material comprising the self-polymerization reaction product of a polymerizable material comprising the self-polymerizable multi-functional compound and a polymeric product resulting from the thermal curing of the thermally curable resin.

More specifically, the above described hybrid curing system is particularly suitable to perform an overall curing mechanism involving a two-stage reaction whereby two polymer networks are formed sequentially.

In a first stage reaction (B-stage), the radiation self-polymerizable multi-functional compounds self-polymerize upon initiation by the free-radical polymerization initiator for the radiation self-polymerizable multi-functional compound, thereby forming a polymeric material comprising the self-polymerization reaction product of a polymerizable material comprising the self-polymerizable multi-functional compounds. Typically, the temperature T1 at which the free-radical polymerization initiator for the radiation self-polymerizable multi-functional compound is initiated is insufficient to cause initiation of the thermal curing initiator of the thermally curable resin. As a consequence, the first stage reaction typically results in a partially cured precursor, wherein the thermally curable resins are substantially uncured and are in particular embedded into the polymeric material comprising the self-polymerization reaction product of the polymerizable material comprising the self-polymerizable multi-functional compounds.

The first stage reaction which typically leads to a phase change of the initial curable precursor due in particular to the polymeric material comprising the self-polymerization reaction product of the self-polymerizable multi-functional compounds providing structural integrity to the initial curable precursor, is typically referred to as a film-forming reaction. Advantageously, the first stage reaction does typically not require any substantial energy input.

The partially cured precursor may typically take the form of a film-like self-supporting composition or a multi-dimensional object having a dimensional stability, which makes it possible for it to be pre-applied on a selected substrate, in particular a liner, until further processing. The partially cured precursor is typically provided with excellent characteristics and performance as to elasticity, tackiness, cold-flow and surface wetting. The radiation self-polymerizable multi-functional compound comprising a polyether oligomeric backbone and at least one free-radical (co)polymerizable reactive group at each terminal position of the oligomer backbone is believed to play a critical role in obtaining the advantageous properties of the partially cured precursor as described above. Advantageously, the partially cured precursor may be appropriately shaped to fulfil the requirements of any specific applications.

The second stage reaction (A-stage) occurs after the first stage reaction and involves thermally curing the thermally curable resins upon thermal initiation by the appropriate thermal curing initiator at a temperature T2 which is typically greater than the temperature T1. This reaction step typically results in forming a polymeric product resulting from the thermal curing of the thermally curable resins, in particular from the (co)polymerization of the thermally curable resins and the thermal curing initiators (or curatives) of the thermally curable resins.

The curable precursor of the present disclosure typically relies on the above-described dual/hybrid curing system involving two independent reactive systems activated with distinct triggering steps to ensure performing the above-described two-stage reaction in a sequential manner. Advantageously, the curable precursor of the present disclosure may be partially cured (or pre-cured) and pre-applied on a selected substrate before being finally cured in-place to produce a structural adhesive provided with excellent characteristics directly on the desired substrate or article.

As such, the curable precursor of the present disclosure is outstandingly suitable for bonding metal parts, in particular for hem flange bonding of metal parts in the automotive industry. The curable precursor of a structural adhesive composition as described herein is also outstandingly suitable for the manufacture of multi-dimensional structural adhesive articles and objects. Advantageously still, the curable precursor is suitable for automated handling and application, in particular by fast robotic equipment.

In the context of the present disclosure, the expression "radiation self-polymerizable compound" is meant to refer to a compound able to form a polymeric product (homopolymer) resulting from the radiation-induced polymerization of the compound almost exclusively with itself, thereby forming a homopolymer. The term "homopolymer" is herein meant to designate polymer(s) resulting exclusively from the polymerization of a single type of monomers.

In the context of the present disclosure still, the expression "thermally curable resin" is meant to refer to a resin/monomer able to form a polymeric product (heteropolymer) resulting from the thermally-induced (co)polymerization of the curable resins and the thermal curing initiators (or curatives) of the thermally curable resins. The term "heteropolymer" is herewith meant to designate a polymer resulting from the (co)polymerization of more than one type of monomers.

In the context of the present disclosure, the expression "the thermally curable resins are substantially uncured" is meant to designate that less than 10 wt. %, less than 5 wt. %, less than 2 wt. %, or even less than 1 wt. % of the initial curable resins are unreacted.

The terms "glass transition temperature" and "Tg" are used interchangeably and refer to the glass transition temperature of a (co)polymeric material or a mixture of monomers and polymers. Unless otherwise indicated, glass transition temperature values are determined by Differential Scanning Calorimetry (DSC).

According to one typical aspect of the curable precursor of the disclosure, the free-radical polymerization initiator is initiated at a temperature T1, wherein the thermal curing initiator is initiated at a temperature T2, wherein the temperature T2 is greater than the temperature T1, and wherein the temperature T1 is insufficient to cause initiation of the thermal curing initiator which therefore remains substantially unreacted.

According to another typical aspect of the curable precursor of the disclosure, the temperature T1 is no greater than 90° C., no greater than 80° C., no greater than 60° C., no greater than 50° C., no greater than 40° C., no greater than 30° C., no greater than 25° C., no greater than 20° C., or even no greater than 15° C.

According to still another typical aspect of the curable precursor of the disclosure, the temperature T1 is in a range from −10° C. to 85° C., from 0° C. to 80° C., from 5° C. to 60° C., from 5° C. to 50° C., from 10 to 40° C., or even from 15 to 35° C.

According to yet another typical aspect of the disclosure, the temperature T2 is greater than 90° C., greater than 100° C., greater than 120° C., greater than 140° C., greater than 150° C., greater than 160° C., greater than 180° C., or even greater than 200° C.

According to yet another typical aspect of the disclosure, the temperature T2 is in a range from 95° C. to 250° C., from 100° C. to 220° C., from 120° C. to 200° C., from 140° C. to 200° C., from 140° C. to 180° C., or even from 160° C. to 180° C.

In another typical aspect of the curable precursor of the disclosure, the thermally curable resin and the radiation self-polymerizable multi-functional compound are (substantially) unable to chemically react with each other, in particular by covalent bonding, even when subjected to polymerization or curing initiation. In an exemplary aspect, the thermally curable resin and the radiation self-polymerizable multi-functional compound are unable to (substantially) chemically react with each other, when subjected to polymerization or curing initiation at a temperature of 23° C.

Thermally curable resins for use herein are not particularly limited. Any thermally curable resins commonly known in the art of structural adhesives may be used in the context of the present disclosure. Suitable thermally curable resins for use herein may be easily identified by those skilled in the art in the light of the present disclosure.

According to an advantageous aspect of the present disclosure, the thermally curable resin for use herein comprises at least one functional group selected from the group consisting of epoxy groups, in particular glycidyl groups.

According to another advantageous aspect, the thermally curable resin for use herein comprises at least one epoxy resin. Exemplary epoxy resins for use herein may be advantageously selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Epoxy resins are well known to those skilled in the art of structural adhesive compositions. Suitable epoxy resins for use herein and their methods of manufacturing are amply described for example in EP-A1-2 700 683 (Elgimiabi et al.) and in WO 2017/197087 (Aizawa).

In a particularly advantageous aspect of the disclosure, the thermally curable resin for use herein is an epoxy resin selected from the group consisting of novolac epoxy resins, bisphenol epoxy resins, in particular those derived from the reaction of bisphenol-A with epichlorhydrin (DGEBA resins), and any mixtures thereof.

Thermal curing initiators for the thermally curable resin for use herein are not particularly limited. Any thermal curing initiators for thermally curable resins commonly known in the art of structural adhesives may be used in the context of the present disclosure. Suitable thermal curing initiators for use herein may be easily identified by those skilled in the art in the light of the present disclosure.

According to one typical aspect of the disclosure, the thermal curing initiator for use herein is selected from the group consisting of rapid-reacting curing initiators, latent curing initiators, and any combinations or mixtures thereof. More typically, the thermal curing initiator for use herein is selected from the group consisting of rapid-reacting thermally-initiated curing initiators, latent thermally-initiated curing initiators, and any combinations or mixtures thereof.

According to an advantageous aspect of the present disclosure, the thermal curing initiator is selected from the group consisting of primary amines, secondary amines, and any combinations or mixtures thereof.

According to another advantageous aspect, the amines for use as thermal curing initiator for the thermally curable resin are selected from the group consisting of aliphatic amines, cycloaliphatic amines, aromatic amines, aromatic structures having one or more amino moiety, polyamines, polyamine adducts, dicyandiamides, and any combinations or mixtures thereof.

According to still another advantageous aspect of the disclosure, the thermal curing initiator for use herein is selected from the group consisting of dicyandiamide, polyamines, polyamine adducts, and any combinations or mixtures thereof.

In a preferred aspect, the curing initiator of the thermally curable resin for use in the present disclosure is selected to be dicyandiamide.

In an advantageous execution, the curable precursor of the present disclosure further comprises a thermal curing accelerator for the thermally curable resin. Any thermal curing accelerators for thermally curable resins commonly known in the art of structural adhesives may be formally used in the context of the present disclosure. Suitable thermal curing initiators for use herein may be easily identified by those skilled in the art in the light of the present disclosure.

Thermal curing initiators and thermal curing accelerators are well known to those skilled in the art of structural adhesive compositions. Suitable thermal curing initiators and thermal curing accelerators for use herein and their methods of manufacturing are amply described for example in EP-A1-2 700 683 (Elgimiabi et al.) and in WO 2017/197087 (Aizawa).

In one advantageous execution, the thermal curing accelerator for use herein is selected from the group consisting of polyamines, polyamine adducts, ureas, substituted urea adducts, imidazoles, imidazole salts, imidazolines, aromatic tertiary amines, and any combinations or mixtures thereof.

In one preferred execution, the thermal curing accelerator for the thermally curable resin is selected from the group of polyamine adducts, substituted ureas, in particular N-substituted urea adducts.

In a particularly preferred execution of the disclosure, the thermal curing accelerator for the thermally curable resin is selected from the group of substituted urea adducts, in particular N-substituted urea adducts. In the context of the present disclosure, it has been indeed surprisingly discovered that the use of a thermal curing accelerator for the thermally curable resin selected from the group of substituted urea adducts, in particular N-substituted urea adducts, substantially improves the adhesion properties, in particular the peel adhesion properties of the resulting structural adhesive composition. Without wishing to be bound by theory, it is believed that the use of a thermal curing accelerator selected from the group of substituted urea adducts, in particular N-substituted urea adducts, beneficially impacts the overall curing profile of the curable precursor according to the present disclosure, which in turn translates into improved adhesion performance.

According to an advantageous aspect of the present disclosure, the curable precursor may further comprise a second thermally curable resin which is typically different from the (first) thermally curable resin as describe above.

In an advantageous aspect, the thermally curable resin for use in the present disclosure comprises at least one functional group selected from the group consisting of epoxy groups, in particular glycidyl groups. Advantageously still, the second thermally curable resin for use herein is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

In a particularly preferred execution of the disclosure, the second thermally curable resin for use herein is an epoxy resin selected from the group consisting of hydrogenated bisphenol epoxy resins, in particular those derived from the reaction of hydrogenated bisphenol-A with epichlorhydrin (hydrogenated DGEBA resins), and any mixtures thereof.

In the context of the present disclosure, it has been indeed surprisingly discovered that the use of a second thermally curable resin selected in particular from the group of hydrogenated bisphenol epoxy resins, substantially maintains or even improve the adhesion properties, in particular the peel adhesion properties of the resulting structural adhesive composition towards oily contaminated substrates. These specific curable precursors are particularly suitable to result into structural adhesive compositions having outstanding excellent oil-contamination tolerance towards, in particular oily contaminated metal substrates.

Exemplary oily contamination is for example mineral oils, and synthetic oils. Typical mineral oils include paraffinic mineral oils, intermediate mineral oils and naphthenic mineral oils.

According to a typical aspect, the curable precursor according to the disclosure comprises from 2 to 50 wt. %, from 2 to 40 wt. %, from 3 to 40 wt. %, from 5 to 30 wt. %, from 10 to 30 wt. %, or even from 15 to 30 wt. %, of the thermally curable resin(s), wherein the weight percentages are based on the total weight of the curable precursor.

Radiation self-polymerizable multi-functional compounds for use herein are not particularly limited, as long as they comprise a polyether oligomeric backbone and at least one free-radical (co)polymerizable reactive group at each terminal position of the oligomer backbone. Suitable radiation self-polymerizable multi-functional compounds for use herein may be easily identified by those skilled in the art in the light of the present disclosure.

Polyether oligomer backbones for use herein are not particularly limited, as long as they fulfill the above-detailed requirements. Suitable polyether oligomer backbones for use herein may be easily identified by those skilled in the art in the light of the present disclosure.

Without wishing to be bound by theory, it is believed that the radiation self-polymerizable multi-functional compounds as described above not only participate in forming the polymeric material comprising the self-polymerization reaction product of the self-polymerizable multi-functional compounds under the stage-B reaction described hereinbefore and which lead to a phase change of the initial curable precursor, but also formally act as a reactive diluent, rheological modifier and compatibilizer for the curable precursor, which in turn contributes to provide the curable precursor with outstanding flexibility characteristics and the stage-B reaction product with advantageous elasticity properties. The radiation self-polymerizable multi-functional compounds as described above are is also believed to beneficially impact the adhesion properties of the curable precursor, due in particular to the beneficial surface wetting properties provided in particular by the oligomeric polyether backbone.

In one advantageous aspect of the present disclosure, the radiation self-polymerizable multi-functional compound for use herein comprises a polyether oligomeric backbone having a number average molecular weight of at least 2000 g/mol.

Unless otherwise indicated, the number average molecular weight of the radiation self-polymerizable multi-functional compound is determined by conventional gel permeation chromatography (GPC) using appropriate techniques well known to those skilled in the art.

In a beneficial aspect of the disclosure, the polyether oligomeric backbone for use herein has a number average molecular weight greater than 2000 g/mol, greater than 2500 g/mol, greater than 3000 g/mol, greater than 3500 g/mol, or even greater than 4000 g/mol.

In another beneficial aspect of the disclosure, the polyether oligomeric backbone has a number average molecular weight greater no greater than 10.000 g/mol, no greater than 9500 g/mol, no greater than 9000 g/mol, no greater than 8500 g/mol, or even no greater than 8000 g/mol.

In still another beneficial aspect, the polyether oligomeric backbone for use in the present disclosure has a number average molecular weight in a range from 2000 to 20.000 g/mol, from 2000 to 15.000 g/mol, from 2000 to 12.000 g/mol, from 2500 to 10.000 g/mol, from 2500 to 9.000 g/mol, from 3000 to 8500 g/mol, from 3500 to 8000 g/mol or even from 4000 to 8000 g/mol.

In yet another beneficial aspect of the disclosure, the polyether oligomeric backbone comprises (or consists of) a linear polyether oligomeric backbone.

According to an advantageous aspect, the (linear) polyether oligomeric backbone for use herein is obtained by copolymerization of tetrahydrofuran units, ethylene oxide units, and optionally propylene oxide units.

In an advantageous aspect, the at least one free-radical (co)polymerizable reactive group located at each terminal position of the polyether oligomeric backbone is selected from the group consisting of ethylenically unsaturated groups.

According to another advantageous aspect, the ethylenically unsaturated groups are selected from the group consisting of (meth)acrylic groups, vinyl groups, styryl groups, and any combinations or mixtures thereof.

In a more advantageous aspect of the disclosure, the ethylenically unsaturated groups for us herein are selected from the group consisting of methacrylic groups, acrylic groups, and any combinations or mixtures thereof.

In a particularly preferred aspect of the disclosure, the ethylenically unsaturated groups for use herein are selected from the group of methacrylic groups.

Advantageously, the radiation self-polymerizable multi-functional compound for use herein is an ethylenically unsaturated compound.

According to one advantageous aspect of the curable precursor of the disclosure, the radiation self-polymerizable multi-functional compound for use herein has the following formula:

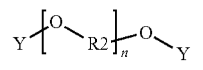

wherein:

Y is a free-radical (co)polymerizable reactive group, in particular an ethylenically unsaturated group;

each $R^2$ is independently selected from the group consisting of alkylene groups having in particular from 2 to 6 carbon atoms;

and n is an integer, which is in particular selected such that the calculated number average molecular weight of the radiation self-polymerizable multi-functional compound is of at least 2000 g/mol.

According to another advantageous aspect of the present disclosure, the radiation self-polymerizable multi-functional compound has the following formula:

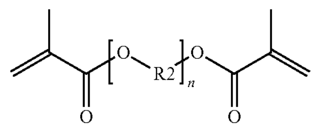

wherein:

each $R^2$ is independently selected from the group consisting of alkylene groups having in particular from 2 to 6 carbon atoms; and n is an integer in particular selected such that the calculated number average molecular weight of the radiation self-polymerizable multi-functional compound is in a range from 2000 to 20.000 g/mol.

In one particular aspect, n is selected such that the calculated number average molecular weight is at least 2000 g/mol, at least 3000 g/mol, or even at least 4000 g/mol. In another particular aspect, n is selected such that the calculated number average molecular weight is no greater than 20.000 g/mol, no greater than 15.000 g/mol, or even no greater than 10.000 g/mol. In still another particular aspect, n is selected such that the calculated number average molecular weight is between 2000 and 20.000 g/mol, between 3000 and 15.000 g/mol, or even between 3000 and 10.000 g/mol, where all ranges are inclusive of the end points.

According to still another advantageous aspect of the present disclosure, the radiation self-polymerizable multi-functional compound has the following formula:

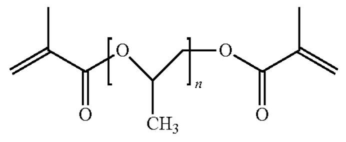

wherein:

n is an integer in particular selected such that the calculated number average molecular weight of the radiation self-polymerizable multi-functional compound is in a range from 2000 to 20.000 g/mol.

According to yet another advantageous aspect of the present disclosure, the radiation self-polymerizable multi-functional compound has the following formula:

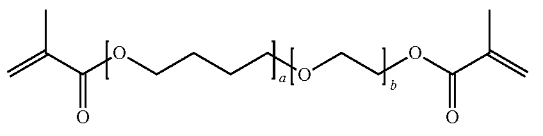

wherein:

a and b are integers greater than or equal to 1, the sum of a and b is equal to n, and wherein n is in particular selected such that the calculated number average molecular weight of the polyether oligomer is in a range from 2000 to 20.000 g/mol.

In one particular aspect, n is selected such that the calculated number average molecular weight is at least 2000 g/mol, at least 3000 g/mol, or even at least 4000 g/mol. In another particular aspect, n is selected such that the calculated number average molecular weight is no greater than 20.000 g/mol, no greater than 15.000 g/mol, or even no greater than 10.000 g/mol. In still another particular aspect, n is selected such that the calculated number average molecular weight is between 2000 and 20.000 g/mol, between 3000 and 15.000 g/mol, or even between 3000 and 10.000 g/mol, where all ranges are inclusive of the end points.

According to yet another advantageous aspect of the present disclosure, the linear polyether oligomeric backbone is obtained by copolymerization of tetrahydrofuran units and ethylene oxide units, wherein the mole ratio of these monomer units is in a range from 1:2.5 to 1:5, or even from 1:3 to 1:4.

According to yet another advantageous aspect, the radiation self-polymerizable multi-functional compound for use in the present disclosure has a glass transition temperature (Tg) no greater than 20° C., no greater than 15° C., or even no greater than 10° C., when measured by Differential Scanning Calorimetry (DSC).

Without wishing to be bound by theory, it is believed that radiation self-polymerizable multi-functional compounds having a glass transition temperature (Tg) no greater than 20° C., no greater than 15° C., or even no greater than 10° C., are provided with advantageous viscoelastic characteristics which are in turn believed to beneficially contribute to providing the advantageous properties described hereinbefore with respect to the overall radiation self-polymerizable multi-functional compound.

In one advantageous aspect, the curable precursor of the present disclosure comprises no greater than 25 wt. %, no greater than 20 wt. %, no greater than 15 wt. %, no greater than 10 wt. %, or even no greater than 8 wt. %, of the radiation self-polymerizable multi-functional compound, wherein the weight percentages are based on the total weight of the curable precursor.

In another advantageous aspect, the curable precursor of the present disclosure comprises from 0.5 to 20 wt. %, from 0.5 to 15 wt. %, from 1 to 15 wt. %, from 2 to 15 wt. %, from 2 to 12 wt. %, from 2 to 10 wt. %, from 3 to 10 wt. %, or even from 3 to 8 wt. %, of the radiation self-polymerizable multi-functional compound, wherein the weight percentages are based on the total weight of the curable precursor.

The curable precursor according to the present disclosure further comprises a free-radical polymerization initiator for the radiation self-polymerizable multi-functional compound. Free-radical polymerization initiators for the radiation self-polymerizable multi-functional compound for use herein are not particularly limited. Suitable free-radical polymerization initiators for the radiation self-polymerizable multi-functional compounds for use herein may be easily identified by those skilled in the art in the light of the present disclosure.

According to a typical aspect of the disclosure, the free-radical polymerization initiator of the radiation self-polymerizable multi-functional compound is selected from the group consisting of Norrish type (I) free-radical polymerization initiators, Norrish type (II) free-radical polymerization initiators, and any combinations or mixtures thereof.

According to one advantageous aspect of the disclosure, the free-radical polymerization initiator of the radiation self-polymerizable multi-functional compound is selected from the group consisting of Norrish type (I) free-radical polymerization initiators, and any combinations or mixtures thereof.

According to a more advantageous aspect of the disclosure, the free-radical polymerization initiator for use herein is selected from the group consisting of benzyl ketals, hydroxy acetophenones, amino acetophenones, aryl alkyl ketones, phosphine oxides, benzoin ethers, substituted acetophenones, substituted alpha-ketols, photoactive oximes, and any combinations or mixtures thereof.

According to an even more advantageous aspect of the disclosure, the free-radical polymerization initiator for use herein is selected from the group consisting of benzyl ketals, hydroxy acetophenones, and any combinations or mixtures thereof.

In one typical aspect, the curable precursor of the disclosure comprises no greater than 10 wt. %, no greater than 8 wt. %, no greater than 6 wt. %, no greater than 5 wt. %, no greater than 4 wt. %, no greater than 2 wt. %, no greater than 1 wt. %, no greater than 0.8 wt. %, no greater than 0.6 wt. %, no greater than 0.5 wt. %, no greater than 0.4 wt. %, no greater than 0.2 wt. %, or even no greater than 0.1 wt. %, of the free-radical polymerization initiator of the radiation self-polymerizable multi-functional compound, wherein the weight percentages are based on the total weight of the curable precursor.

In another typical aspect, the curable precursor of the disclosure comprises from 0.01 to 10 wt. %, from 0.01 to 8 wt. %, from 0.02 to 6 wt. %, from 0.02 to 5 wt. %, from 0.02 to 4 wt. %, from 0.03 to 3 wt. %, from 0.03 to 2 wt. %, from 0.03 to 1.8 wt. %, from 0.03 to 1.6 wt. %, from 0.03 to 1.5 wt. %, from 0.03 to 1.4 wt. %, or even from 0.03 to 1 wt. %, of the free-radical polymerization initiator of the radiation self-polymerizable multi-functional compound, wherein the weight percentages are based on the total weight of the curable precursor.

In one particular aspect of the curable precursor according to the disclosure, the weight ratio of the radiation self-polymerizable multi-functional compound to the free-radical polymerization initiator of the radiation self-polymerizable multi-functional compound is a range from 200:1 to 5:1, 180:1 to 8:1, 150:1 to 8:1, 100:1 to 8:1, or even from 100:1 to 10:1.

According to one advantageous aspect, the curable precursor of the present disclosure comprises:

a) from 5 to 40 wt. %, from 5 to 35 wt. %, from 10 to 35 wt. %, from 15 to 35 wt. %, from 15 to 30 wt. %, or even from 15 to 25 wt. %, of the thermally curable resin(s);

b) from 0.1 to 20 wt. %, from 0.2 to 15 wt. %, from 0.2 to 10 wt. %, from 0.5 to 8 wt. %, from 1 to 6 wt. %, or even from 2 to 5 wt. %, of the thermal curing initiator for the thermally curable resin;

c) from 0.5 to 20 wt. %, from 0.5 to 15 wt. %, from 1 to 15 wt. %, from 2 to 15 wt. %, from 2 to 12 wt. %, from 2 to 10 wt. %, from 3 to 10 wt. %, or even from 3 to 8 wt. %, of the radiation self-polymerizable multi-functional compound; d) from 0.01 to 10 wt. %, from 0.02 to 6 wt. %, from 0.02 to 5 wt. %, from 0.02 to 4 wt. %, from 0.03 to 2 wt. %, from 0.03 to 1.8 wt. %, from 0.03 to 1.5 wt. %, or even from 0.03 to 1 wt. %, of the free-radical polymerization initiator for the radiation self-polymerizable multi-functional compound;

e) optionally, 0.05 to 10 wt. %, from 0.1 to 8 wt. %, from 0.1 to 5 wt. %, from 0.2 to 4 wt. %, from 0.5 to 3 wt. %, or even from 1 to 3 wt. %, of a thermal curing accelerator for the thermally curable resin;

f) optionally, a toughening agent; and g) optionally, a thixotropic agent;

wherein the weight percentages are based on the total weight of the curable precursor.

In an advantageous execution, the curable precursor of the present disclosure may further comprise a thixotropic agent. Any thixotropic agents commonly known in the art of structural adhesives may be formally used in the context of the present disclosure. Suitable thixotropic agents for use herein may be easily identified by those skilled in the art in the light of the present disclosure.

According to one advantageous aspect of the disclosure, the curable precursor further comprises a thixotropic agent which is typically selected from the group of inorganic and organic thixotropic agents.

According to another advantageous aspect of the disclosure, the thixotropic agent for use herein is selected from the group of particulate thixotropic agents.

According to a more advantageous aspect of the disclosure, the thixotropic agent for use herein is selected from the group of inorganic thixotropic agents, in particular silicon-based thixotropic agents and aluminum-based thixotropic agents.

According to an even more advantageous aspect of the disclosure, the thixotropic agent for use herein is selected from the group consisting of silica-based and silicate-based thixotropic agents.

In one very advantageous aspect, the curable precursor of the present disclosure further comprises a thixotropic agent selected from the group consisting of fumed silica particles, in particular hydrophilic fumed silica and hydrophobic fumed silica; silicates particles, in particular phyllosilicates, and any mixtures thereof.

In one particularly advantageous aspect of the disclosure, the thixotropic agent for use herein is selected from the group of organic thixotropic agents, in particular polyamide waxes, hydrolysed castor waxes and urea derivatives-based thixotropic agents.

In another particularly advantageous aspect of the disclosure, the thixotropic agent for use herein is selected from the group consisting of fumed silica particles, in particular hydrophobic fumed silica particles; silicate-based particles, in particular phyllosilicate particles; polyamide waxes, and any mixtures thereof.

According to an exemplary aspect of the present disclosure, the curable precursor comprises no greater than 20 wt. %, no greater than 15 wt. %, no greater than 10 wt. %, no greater than 8 wt. %, or even no greater than 5 wt. %, of the thixotropic agent, based on the overall weight of the curable precursor.

According to another exemplary aspect of the present disclosure, the curable precursor comprises from 0.05 to 20 wt. %, from 0.1 to 15 wt. %, from 0.5 to 10 wt. %, from 0.5 to 8 wt. %, from 1 to 6 wt. %, or even from 1 to 5 wt. %, of the thixotropic agent, based on the overall weight of the curable precursor.

The curable precursor of the disclosure may take any suitable form, as well known to those skilled in the art of structural adhesives. Suitable forms will depend on the targeted application and usage conditions.

In one advantageous aspect of the present disclosure, the curable precursor is in the form of a one-part (hybrid) structural adhesive composition. One-part curable precursors are advantageous over two-part curable precursor compositions in that they do not involve any specific delayed mixing steps, which usual require special precautions, additional process steps and specialized equipment. One-part curable precursors are usually characterized by providing more processing and formulation flexibility than their two-part counterparts. However, the present disclosure is not that limited.

Accordingly, and in an alternative aspect, the curable precursor of the present disclosure is in the form of a two-part (hybrid) structural adhesive composition having a first part and a second part, wherein:

a) the first part comprises:
   i. the radiation self-polymerizable multi-functional compound; and
   ii. the thermal curing initiator for the thermally curable resin;
b) the second part comprises:
   i. the thermally curable resin; and
   ii. the free-radical polymerization initiator for the radiation self-polymerizable multi-functional compound;

wherein the first part and the second part are kept separated prior to combining the two parts and forming the (hybrid) structural adhesive composition.

According to another alternative aspect, the curable precursor of the present disclosure is in the form of a two-part (hybrid) structural adhesive composition having a first part and a second part, wherein:

a) the first part comprises:
   i. the radiation self-polymerizable multi-functional compound; and
   ii. the free-radical polymerization initiator for the radiation self-polymerizable multi-functional compound;
b) the second part comprises:
   i. the thermally curable resin; and
   ii. the thermal curing initiator for the thermally curable resin;

wherein the first part and the second part are kept separated prior to combining the two parts and forming the (hybrid) structural adhesive composition.

According to another aspect, the present disclosure is directed to a partially cured precursor of a structural adhesive composition, comprising:

a) a polymeric material comprising the self-polymerization reaction product of a polymerizable material comprising a radiation self-polymerizable multi-functional compound;
b) optionally, some residual free-radical polymerization initiator for the radiation self-polymerizable multi-functional compound;
c) a thermally curable resin; and
d) a thermal curing initiator for the thermally curable resin; and wherein the thermally curable resin(s) are (substantially) uncured and are in particular embedded into the polymeric material comprising the self-polymerization reaction product of a polymerizable material comprising a radiation self-polymerizable multi-functional compound.

In a typical aspect of the partially cured precursor of a structural adhesive, the thermally curable resins are substantially uncured and are, in particular, embedded into the polymeric material comprising the self-polymerization reaction product of a polymerizable material comprising a radiation self-polymerizable multi-functional compound. In a typical aspect, the thermally curable resins are still liquid compounds embedded into the polymeric material resulting from the self-polymerization of the radiation self-polymerizable multi-functional compounds, wherein this polymeric material represents a fully established three-dimensional network.

The partially cured precursor typically is a stable and self-supporting composition having a dimensional stability, which makes it possible for it to be pre-applied on a selected substrate, in particular a liner, until further processing. In particular, the pre-applied substrate may be suitably transferred to other production sites until final full curing is performed. Advantageously still, the partially cured precursor may be appropriately shaped or printed to fulfil the specific requirements of any selected applications. The partially cured precursor is typically provided with excellent characteristics and performance as to elasticity, tackiness, cold-flow and surface wetting.

According to a typical aspect of the partially cured precursor according to the disclosure, the polymeric material comprising the self-polymerization reaction product of the polymerizable material comprising the radiation self-polymerizable multi-functional compound is substantially fully polymerized and has in particular a degree of polymerization of more than 90%, more than 95%, more than 98%, or even more than 99%.

As the polymeric material comprising the self-polymerization reaction product of the radiation self-polymerizable multi-functional compound is substantially fully polymerized, this polymerization reaction has advantageously a fixed and irreversible end and will not trigger any shelf-life reducing reactions in the remaining of the curable precursor. This characteristic is believed to beneficially impact the overall shelf-life of the curable precursor.

In one typical aspect of the disclosure, the partially cured precursor has a shear storage modulus in a range from 1000 to 250.000 Pa, from 1000 to 200.000 Pa, from 2000 to 150.000 Pa, from 3000 to 150.000 Pa, from 3000 to 100.000 Pa, or even from 3000 to 80.000 Pa, when measured according to the test method described in the experimental section.

In one advantageous aspect, the partially cured precursor according to the disclosure has a glass transition temperature (Tg) no greater than 0° C., no greater than −5° C., no greater than −10° C., no greater than −15° C., or even no greater than −20° C., when measured by DSC.

In another advantageous aspect of the disclosure, the partially cured precursor has an elongation at break of at least 50%, at least 80%, at least 100%, at least 150%, or even at least 200%, when measured according to tensile test DIN EN ISO 527. This particular property makes the partially cured precursor and the resulting structural adhesive suitable for automated handling and application, in particular by high-speed robotic equipment. More particularly, the partially cured precursor and the resulting structural adhesive of the present disclosure enables efficient automation of the process of forming a metal joint between metal plates.

According to another aspect, the present disclosure relates to a structural adhesive composition obtainable by substantially fully curing the curable precursor as described above, in particular at a temperature T2 or greater.

In the context of the present disclosure, the expression "substantially fully curing the curable precursor" is meant to express that more than 90 wt. %, more than 95 wt. %, more than 98 wt. %, or even more than 99 wt. % of the overall amount of the thermally curable resins and the radiation self-polymerizable multi-functional compounds are polymerized/cured as the result of the polymerization/curing step(s).

In atypical aspect, the structural adhesive composition comprises an interpenetrating network involving the polymeric material comprising the self-polymerization reaction product of the polymerizable material comprising the radiation self-polymerizable multi-functional compound and the polymeric product resulting from the curing of the thermally curable resin.

The curable precursor or the partially or fully cured (hybrid) structural adhesive compositions of the disclosure may take or be shaped in any suitable form, depending on the targeted application and usage conditions.

According to one advantageous aspect, the curable precursor or the partially or fully cured structural adhesive composition of the present disclosure is shaped in the form of an elongated film. The elongated film shape is one conventional and convenient shape for the structural adhesive to be pre-applied on a selected substrate, in particular a liner, until further processing.

In one particular aspect of the disclosure, the elongated film for use herein has a thickness greater than 500 micrometres, greater than 600 micrometres, greater than 700 micrometres, greater than 800 micrometres, greater than 900 micrometres, or even greater than 1000 micrometres.

In another particular aspect of the disclosure, the elongated film for use herein has a thickness no greater than 500 micrometres, no greater than 400 micrometres, no greater than 300 micrometres, no greater than 200 micrometres, no greater than 100 micrometres, or even greater than 50 micrometres.

Although the elongated film shape may be convenient in many different applications, this specific shape is not always satisfactory for adhesively bond assemblies provided with complex three-dimensional configurations or topologies, in particular when provided with challenging bonding areas or surfaces.

Accordingly, the curable precursor or the partially or fully cured (hybrid) structural adhesive composition of the disclosure may—in another aspect—be shaped in the form of a three-dimensional object. Suitable three-dimensional object shapes for use herein will broadly vary depending on the targeted bonding application and the specific configuration of the assembly to bond, in particular the bonding area. Exemplary three-dimensional object shapes for use herein will be easily identified by those skilled in the art in the light of the present disclosure.

According to one exemplary aspect of the present disclosure, the three-dimensional object has a shape selected from the group consisting of circular, semi-circular, ellipsoidal, square, rectangular, triangular, trapezoidal, polygonal shape, or any combinations thereof.

In the context of the present disclosure, the shape of the three-dimensional object is herein meant to refer to the shape of the section of the three-dimensional object according to a direction substantially perpendicular to the greatest dimension of the three-dimensional object.

In yet another aspect, the present disclosure relates to a composite article comprising a curable precursor or a partially or fully cured (hybrid) structural adhesive composition as described above applied on at least part of the surface of the article.

Suitable surfaces and articles for use herein are not particularly limited. Any surfaces, articles, substrates and material commonly known to be suitable for use in combination with structural adhesive compositions may be used in the context of the present disclosure.

In a typical aspect, the article for use herein comprises at least one part, in particular a metal or a composite material part.

In an advantageous aspect, the composite article according to the disclosure is used for body-in-white bonding applications for the automotive industry, in particular for hem flange bonding of parts, more in particular metal or composite material parts; and for structural bonding operations for the aeronautic and aerospace industries.

According to still another aspect of the present disclosure, it is provided a curing system suitable for a (hybrid) structural adhesive composition, wherein the curing system comprises:

a) a thermal curing initiator for a thermally curable resin; and b) a free-radical polymerization initiator for the radiation self-polymerizable multi-functional compound comprising a polyether oligomeric backbone and at least one free-radical (co)polymerizable reactive group at each terminal position of the oligomeric backbone.

All the particular and preferred aspects relating to, in particular, the structural adhesive composition, the thermally curable resin, the thermal curing initiator for the thermally curable resin, the radiation self-polymerizable multi-functional compound, the free-radical polymerization initiator for the radiation self-polymerizable multi-functional compound, the temperatures T1 and T2, and the curable precursor or partially cured precursor which were described hereinabove in the context of the curable precursor or the partially cured precursor, are fully applicable to the curing system for a structural adhesive composition.

According to another aspect, the present disclosure is directed to a method of manufacturing a composite article comprising the step of using a curable precursor as described above or a partially cured precursor as described above.

According to yet another aspect, the present disclosure provides a method of manufacturing a (hybrid) structural adhesive composition, comprising the steps of:

a) providing a curable precursor as described above;

b) partially curing the curable precursor of step a) by initiating the free-radical polymerization initiator for the radiation self-polymerizable multi-functional compound, thereby forming a partially cured precursor comprising a polymeric material resulting from the self-polymerization reaction product of the radiation self-polymerizable multi-functional compound; and c) substantially fully curing the partially cured precursor of step b) by initiating the thermal curing initiator for the thermally curable resin, thereby obtaining a substantially fully cured (hybrid) structural adhesive composition.

In the context of the present disclosure, the expression "substantially fully curing the partially cured precursor" is meant to express that more than 90 wt. %, more than 95 wt. %, more than 98 wt. %, or even more than 99 wt. % of the overall amount of the thermally curable resins and the radiation self-polymerizable multi-functional compounds are polymerized/cured as the result of the polymerization/curing step(s).

In yet another aspect of the present disclosure, it is a provided a method of bonding two parts comprising the step of using a curable precursor or a partially cured precursor as described above.

According to a particular aspect of the disclosure, the method of bonding two parts comprises the steps of a) applying a curable precursor or a partially cured precursor as described above to a surface of at least one of the two parts;

b) joining the two parts so that the curable precursor or the partially cured precursor (hybrid) structural adhesive composition is positioned between the two parts; and c) optionally, partially curing the curable precursor according of step a) by initiating the free-radical polymerization initiator for the radiation self-polymerizable multi-functional compound, thereby forming a partially cured precursor comprising a polymeric material resulting from the self-polymerization reaction product of the radiation self-polymerizable multi-functional compound; and/or d) substantially fully curing the partially cured precursor of step a) or c) by initiating the thermal curing initiator for the thermally curable resin, thereby obtaining a substantially fully cured (hybrid) structural adhesive composition and bonding the two parts.

According to an advantageous aspect of the method of bonding two parts, wherein the two parts are metal parts.

According to another advantageous aspect, the method of bonding two parts is for hem flange bonding of metal parts, wherein:

the partially cured precursor is shaped in the form of an elongated film;

the partially cured precursor film has a first portion near a first end of the precursor film and a second portion near the second end opposite to the first end of the precursor film;

the first metal part comprises a first metal panel having a first body portion and a first flange portion along a margin of the first body portion adjacent a first end of the first body portion;

the second metal part comprises a second metal panel having a second body portion and a second flange portion along a margin of the second body portion adjacent a second end of the second body portion;

wherein the method comprises the steps of:

a) adhering the partially cured precursor film to the first metal panel or second metal panel, whereby following adhering and folding, a metal joint is obtained wherein the partially cured precursor film is folded such that:

i. the first portion of the partially cured precursor film is provided between the second flange of the second metal panel and the first body portion of the first metal panel, and ii. the second portion of the partially cured precursor film is provided between the first flange of the first metal panel and the second body portion of the second metal panel; and b) substantially fully curing the partially cured precursor by initiating the thermal curing initiator for the thermally curable resin, thereby obtaining a substantially fully cured (hybrid) structural adhesive composition and bonding the metal joint.

According to still another advantageous aspect of the method of bonding two parts, a side of a first edge portion of the first metal part is folded back and a hem flange structure is formed so as to sandwich the second metal part, and the curable precursor or the partially cured precursor as described above is disposed so as to adhere at least the first edge portion of the first metal part and a first surface side of the second metal part to each other.

Methods of bonding two parts, in particular for hem flange bonding of metal parts, are well known to those skilled in the art of structural adhesive compositions. Suitable methods of bonding two parts for use herein are amply described e.g. in EP-A1-2 700 683 (Elgimiabi et al.) and in WO 2017/197087 (Aizawa).

In a particular aspect of the present disclosure, the substrates, parts and surfaces for use in these methods comprise a metal selected from the group consisting of aluminum, steel, iron, and any mixtures, combinations or alloys thereof. More advantageously, the substrates, parts and surfaces for use herein comprise a metal selected from the group consisting of aluminum, steel, stainless steel and any mixtures, combinations or alloys thereof. In a particularly advantageous execution of the present disclosure, the substrates, parts and surfaces for use herein comprise aluminum.

According to another aspect, the present disclosure relates to a metal part assembly obtainable by the method(s) as described above.

In yet another aspect of the disclosure, it is provided a (continuous) process of manufacturing a (shaped) curable precursor of a (hybrid) structural adhesive composition, comprising the steps of:

a) providing a mixing apparatus comprising a reaction chamber and an extrusion die;
b) providing a curable precursor of a (hybrid) structural adhesive composition as described above;
c) incorporating and mixing the curable precursor of the (hybrid) structural adhesive composition in the reaction chamber of the mixing apparatus, thereby forming an extrudable composition;
d) pressing the extrudable composition of step c) through the extrusion die, thereby forming an extrudate of the curable precursor of the (hybrid) structural adhesive composition;
e) optionally, shaping the extrudate;
f) optionally, cooling down the extrudate of step d) or e); and
g) self-polymerizing or allowing the self-polymerization reaction of the radiation self-polymerizable multi-functional compound in the extrudate.

According to an advantageous aspect of the process of manufacturing a curable precursor of a structural adhesive composition, the free-radical polymerization initiator is initiated at a temperature T1, wherein the thermal curing initiator is initiated at a temperature T2, wherein the temperature T2 is greater than the temperature T1, and wherein the temperature T1 is insufficient to cause initiation of the thermal curing initiator.

According to another advantageous aspect of the process, the step of incorporating and mixing the curable precursor of the (hybrid) structural adhesive composition in the reaction chamber of the mixing apparatus thereby forming an extrudable composition, is performed at a temperature no greater than temperature T2, and in particular no greater than temperature T1.

According to still another advantageous aspect of the process, the temperature T1 is no greater than 90° C., no greater than 80° C., no greater than 60° C., no greater than 50° C., no greater than 40° C., no greater than 30° C., no greater than 25° C., no greater than 20° C., or even no greater than 15° C.

According to still another advantageous aspect of the process, the temperature T1 is in a range from −10° C. to 85° C., from 0° C. to 80° C., from 5° C. to 60° C., from 5° C. to 50° C., from 10 to 40° C., or even from 15 to 35° C.

According to yet another advantageous aspect of the process, the temperature T2 is greater than 90° C., greater than 100° C., greater than 120° C., greater than 140° C., greater than 150° C., greater than 160° C., greater than 180° C., or even greater than 200° C.

According to yet another advantageous aspect of the process, the temperature T2 is in a range from 95° C. to 250° C., from 100° C. to 220° C., from 120° C. to 200° C., from 140° C. to 200° C., from 140° C. to 180° C., or even from 160° C. to 180° C.

In a further beneficial aspect of the process of manufacturing a curable precursor of a structural adhesive composition, the step of self-polymerizing or allowing the self-polymerization reaction of the radiation self-polymerizable multi-functional compound in the extrudate, is performed with the provision of (high-energy actinic) radiation, more in particular UV radiation, e-beam radiation or gamma radiation.

In still a further beneficial aspect of the process, the step of self-polymerizing or allowing the self-polymerization reaction of the radiation self-polymerizable multi-functional compound in the extrudate, is performed with the provision of UV radiation, in particular UV-C radiation or UV-A radiation, more in particular UV-A radiation.

In still a further beneficial aspect of the disclosure, the step of forming an extrudate of the curable precursor of the (hybrid) structural adhesive composition involves a calendering process step, in particular a calendering process step whereby the extrudable composition is guided into the nip gap of two counterrotating rolls.

In still a further beneficial aspect of the disclosure, the process of manufacturing a curable precursor of a structural adhesive composition further comprises the step of shaping the extrudate of step c) in the form of a three-dimensional object, and wherein the step of shaping the extrudate is in particular performed simultaneously with the step of pressing the extrudable composition through the extrusion die.

In still another beneficial aspect of the process, the three-dimensional object for use herein has a shape selected from the group consisting of circular, semi-circular, ellipsoidal, square, rectangular, triangular, trapezoidal, polygonal shape, or any combinations thereof.

In another alternative aspect of the process, the three-dimensional object for use herein is shaped in the form of an elongated film.

According to a particularly beneficial aspect of the process, the mixing apparatus for use herein is selected from the group consisting of single- and multi-screw extruders, and any combinations thereof.

In the context of the present disclosure, it has been surprisingly discovered that the use of single- and multi-screw extruders is particularly beneficial in the process of manufacturing a (shaped) curable precursor of a (hybrid) structural adhesive composition as described above. Single- and multi-screw extruders have been found to provide excellent mixing performance and characteristics for the initial ingredients and raw materials of the curable precursor as described above, which in turn provide excellent extrudability characteristics of the extrudable composition, in particular when used in combination with an extrusion die.

According to another beneficial aspect of the process, the mixing apparatus for use herein is selected from the group consisting of single screw extruders, twin screw extruders, planetary roller extruders, and ring extruders.

According to a more beneficial aspect of the process, the mixing apparatus for use herein is selected from the group consisting of co-rotating multi-screw extruders and counter-rotating multi-screw extruders.

According to an even more beneficial aspect of the process, the mixing apparatus for use herein is a twin-screw extruder, in particular a co-rotating twin-screw extruder.

According to an alternatively beneficial aspect of the process, the mixing apparatus for use herein is a planetary roller extruder comprising in particular a center spindle and multiple planetary gear spindles with center spindle and planetary gear spindles featuring a screw like geometry.

According to yet another aspect, the present disclosure is directed to a process of manufacturing a (hybrid) structural adhesive article, comprising the steps of:

a) applying a curable precursor as described above onto a substrate using a printing technique;
b) partially curing the curable precursor of step a) by initiating the free-radical polymerization initiator for the radiation self-polymerizable multi-functional compound, thereby forming a partially cured precursor of a (hybrid) structural adhesive article comprising a polymeric material resulting from the self-polymerization reaction product of the radiation self-polymerizable multi-functional compound;
c) optionally, substantially fully curing the partially cured precursor of a (hybrid) structural adhesive article obtained in step b) by initiating the thermal curing initiator for the thermally curable resin, thereby obtaining a substantially fully cured (hybrid) structural adhesive article; and
d) optionally, removing the partially cured precursor of a (hybrid) structural adhesive article obtained in step b) or the substantially fully cured (hybrid) structural adhesive article obtained in step c) from the substrate.

In the context of the present disclosure, it has been surprisingly discovered that the curable precursor as described hereinbefore is particularly suitable for being applied on various substrates by various printing techniques, including conventional and less conventional printing techniques. Without wishing to be bound by theory, it is believed this excellent compatibility for printing techniques is due to the advantageous viscosity and rheological properties of the curable precursor as described above.

In an advantageous aspect of the process of manufacturing a structural adhesive article, the structural adhesive article for use herein is in the form of a two-dimensional object or three-dimensional object.

In one more advantageous aspect of the process, the three-dimensional object for use herein has a shape selected from the group consisting of circular, semi-circular, ellipsoidal, square, rectangular, triangular, trapezoidal, polygonal shape, or any combinations thereof.

In another more advantageous aspect of the process, the three-dimensional object for use herein is shaped in the form of an elongated film, a continuous or discontinuous bead, a designed shape or figure, a readable text or logo, and any combinations thereof.

According to yet another aspect of the present disclosure, it is provided a process of printing a (hybrid) structural adhesive composition, comprising the steps of:

a) applying a curable precursor as described above onto a substrate using a printing technique;
b) partially curing the curable precursor of step a) by initiating the free-radical polymerization initiator for the radiation self-polymerizable multi-functional compound, thereby forming a partially cured precursor comprising a polymeric material resulting from the self-polymerization reaction product of the radiation self-polymerizable multi-functional compound; and
c) optionally, substantially fully curing the partially cured precursor of step b) by initiating the thermal curing initiator for the thermally curable resin.

In one typical aspect of these processes, the printing technique for use herein is selected from the group consisting of inkjet printing, screen printing, gravure printing, flexographic printing, offset printing, thermo-driven printing, piezo-driven printing, pressure-driven printing, robocasting, direct ink-writing, 3D printing pen, xyz robotic dispensing, micro dispensing printing, displacement-driven dispensing printing, pneumatic-driven dispensing printing, and any combinations thereof.

In a particular advantageous aspect of these processes, the printing technique for use herein is selected from the group consisting of micro dispensing printing techniques, in particular inkjet printing, more in particular piezo-driven (multi-dimensional) inkjet printing.

In the context of the present disclosure, it has been indeed surprisingly discovered that the curable precursor as described hereinbefore is particularly suitable for being applied by micro dispensing printing techniques, in particular using piezo-driven inkjet printing devices controlled by a piezo actuator.

According to still another aspect, the present disclosure relates to the use of a curable precursor or a partially or fully cured (hybrid) structural adhesive composition as described above, for industrial applications, in particular for construction and automotive applications, more in particular for body-in-white bonding applications for the automotive industry and for structural bonding operations for the aeronautic and aerospace industries.

In a preferred aspect of the disclosure, the curable precursor or the partially or fully cured (hybrid) structural adhesive composition as described above is used for bonding metal or composite material parts, in particular for hem flange bonding of metal or composite material parts in the automotive industry.

According to yet another aspect, the present disclosure relates to the use of a curable precursor or a partially cured precursor as described above, for bonding metal or composite material parts, in particular for hem flange bonding of metal or composite material parts in the automotive industry.

In yet another aspect, the present disclosure relates to the use of a curable precursor or a partially or fully cured (hybrid) structural adhesive composition as described above, for forming a curable precursor or a partially or fully cured (hybrid) structural adhesive composition shaped in the form of an article as described hereinbefore.

In yet another aspect, the present disclosure relates to the use of a curable precursor of a (hybrid) structural adhesive composition as described above, for (hybrid) structural adhesive printing.

In yet another aspect, the present disclosure is directed to the use of a curing system as described above for the manufacturing of a (hybrid) structural adhesive composition as described above.

EXAMPLES

The present disclosure is further illustrated by the following examples. These examples are merely for illustrative purposes only and are not meant to be limiting on the scope of the appended claims.

Test Methods:

Preparation of the Formulations for Testing:

The curable precursor compositions are prepared from an extruded mixture of a one-component or a two-components (Part B and Part A) formulation. The preparation of the various components is described hereinafter. After a homogeneous mixture is achieved, the formulations are extruded between two liners producing a film having 0.3 mm thickness by using a knife coater. The samples are then placed under a UV-A lamp, irradiating the adhesive film for 4 minutes, which initiates the first reaction step (B-stage reaction step) resulting in a partially cured precursor. The resulting tape is then cut into shape and applied to the surface of the test panel for further testing in the manner specified below.

Preparation of the Test Samples for OLS and T-Peel Tests:

The surface of OLS and T-peel samples (steel, grade DX54+ZMB-RL1615) are cleaned with n-heptane and in case of oily contaminated samples, coated with 3 $g/m^2$ of the testing oil (PL 3802-39S commercially available from Fuchs Petrolub AG, Germany). The test samples are left at ambient room temperature (23° C.+/−2° C., 50% relative humidity+/−5%) for 24 hours prior to testing and the OLS and T-peel strengths are measured as described below.

1) Overlap Shear Strength (OLS) According to DIN EN 1465.

Overlap shear strength is determined according to DIN EN 1465 using a Zwick Z050 tensile tester (commercially available by Zwick GmbH & Co. KG, Ulm, Germany) operating at a cross head speed of 10 mm/min. For the preparation of an Overlap Shear Strength test assembly, the shaped B-stage tape is placed onto one surface of a prepared test panel. Afterwards, the sample is covered by a second steel strip forming an overlap joint of 13 mm. The overlap joints are then clamped together using two binder clips and the test assemblies are further stored at room temperature for 4 hours after bonding, and then placed into an air circulating oven for 30 minutes at 180° C. The next day, the samples are tested directly. Five samples are measured for each of the examples and results averaged and reported in MPa.

2) T-Peel Strength According to DIN EN ISO 11339.

T-Peel strength is determined according to DIN EN ISO 11339 using a Zwick Z050 tensile tester (commercially available by Zwick GmbH & Co. KG, Ulm, Germany) operating at a cross head speed of 100 mm/min. For the preparation of a T-Peel Strength test assembly, the shaped B-stage tape is directly placed onto the middle of the T-peel test panel. The second test panel surface is then immediately bonded to the first forming an overlap joint of 100 mm. The samples are then fixed together with clamps and first stored at room temperature for 12 hours, and then placed into an air circulating oven for 30 minutes at 180° C. The next day, the samples are tested directly. Three samples are measured for each of the examples and results averaged and reported in Newtons (N).

3) Shear Storage Modulus (G').

The shear storage modulus is determined on a plate-plate rheometer (ARES, Rheometric Scientific) at a constant temperature (35° C.).

Raw materials:

In the examples, the following raw materials are used:

Eponex 1510 is a hydrogenated bisphenol epoxy resin, commercially available from Hexion Specialty Chemicals GmbH, Iserlohn, Germany.

DEN 431 is an epoxy resin, commercially available from DOW Chemical Pacific, The Heeren, Singapore.

Epikote 828 is an epoxy resin, commercially available from Hexion Specialty Chemicals GmbH, Iserlohn, Germany.

Epikote 1004 is an epoxy resin, commercially available from Hexion Specialty Chemicals GmbH, Iserlohn, Germany.

1K EBSA is a one-component epoxy-based structural adhesive comprising: a) from 55 to 65 wt. % of bisphenol-A-(epichlorhydrin) epoxy resin (having a number average molecular weight Mn no greater than 700 g/mol; b) from 1.0 to 5.0 wt. % of bisphenol A; and c) from 1.0 to 2.5 wt. % of glycidyl neodecanoate, and which is obtained from 3M Deutschland GmbH, Neuss, Germany.

Amicure CG1200 is a dicyandiamide-based latent curing initiator for epoxides, commercially from available from Evonik, Allentown, PA, USA.

Dyhard UR500 is a urea-based curing accelerator for epoxides, commercially available from AlzChem Trostberg, Germany.

Amicure UR2T is a urea-based curing accelerator for epoxides, commercially available from Evonik, Allentown, PA, USA.

Ancamine 2441 is a polyamine-based curing accelerator for epoxides, commercially available Evonik, Allentown, PA, USA.

D-6000-DMA is a dimethacrylate polyether oligomer having a number average molecular weight of about 6000 g/mol, and which is obtained from 3M Espe GmbH, Germany.

KaneAce MX 257 is a toughening agent, commercially available from Kaneka Belgium N.V., Westerlo, Belgium.

KaneAce MX 153 is a toughening agent, commercially available from Kaneka Belgium N.V., Westerlo, Belgium.

Paraloid EXL 2650J is a toughening agent, commercially available from IMCD Benelux N.V., Mechelen, Belgium.

Omnirad BDK 2,2-dimethoxy-2-phenylacetophenone is a free-radical polymerization initiator, commercially available from iGm resins, Waalwijk Netherlands.

Irgacure 1173 2-Hydroxy-2-methyl-1-phenyl-propan-1-one a free-radical polymerization initiator, commercially available from BASF, Germany.

Shieldex AC-5 is a silica based anti-corrosive agent, commercially available from Grace GmbH, Germany.

MinSil SF20 is a fused silica filler, obtained from the 3M Company, USA.

Aerosil R202 is a fumed silica surface-treated with polydimethylsiloxane, commercially available from Evonik GmbH, Germany.

Dynasylan GLYEO is a silane-based adhesion promoter agent, commercially available from Evonik GmbH, Germany.

EXAMPLES

Preparation of Example 1

The exemplary 1-component curable composition according of Example 1 is prepared by combining the ingredients from the list of materials of Table 1. KaneAce MX 257, KanAce MX 153, Eponex 1510 and DEN 431 are first placed in a small beaker and mixed together using a planetary high-speed mixer (DAC 150 FVZ Speedmixer, available from Hauschild Engineering, Germany) stirring at 3500 rpm for 1 minute. Aerosil R202 is added and mixed into the resins under vacuum at 1500 rpm for 2 minutes using a high-speed vacuummixer 'ARV-130 Thinky Mixer, available from Thinky Corporation, USA). Then, Omnirad BDK is added and mixed until a homogeneous mixture is achieved. Thereafter, Sil Cell 32, Shieldex AC-5 and MinSil SF20 are subsequently added and blended into the mixture by mixing at 3500 rpm for 1 minute. Then, Dynasylan GLYEO is added, followed by Amicure CG 1200, Dyhard UR500 and D-6000-DMA. In Table 1, all concentrations are given as wt. %.

Preparation of Examples 2 to 4

The exemplary 1-component curable compositions of Examples 2 to 4 are prepared by combining the ingredients from the list of materials of Table 1 in a 18 mm twin screw extruder with L/D ratio of 48 (from Coperion GmbH, Stuttgart, Germany) and a screw speed of 1200 rpm. The extruder is operated at 300 rpm and all barrels are set at a temperature of 30° C. The described formulations make use of a masterbatch comprising 37.5 wt. % Paraloid EXL and 62.5 wt. % Epikote 828 (hereinafter designated as MB EXL/828).

Preparation of Example 5

The exemplary 2-component (Part A and Part B) curable composition of Example 5 is prepared by combining the ingredients from the list of materials of Table 1. Betamate 1480 is placed in a small beaker acting as Part B.

D-6000-DMA is placed in a separate small beaker. Irgacure 1173 is then added and mixed using a planetary high-speed mixer (DAC 150.1 FVZ Speedmixer, available from Hauschild Engineering, Germany) at 3500 rpm for 1 minute until a homogeneous mixture is achieved, thereby forming Part A. Before use, Parts A and B are mixed using the planetary high-speed mixer at 3500 rpm for 1 minute until a homogeneous mixture is achieved.

TABLE 1

Exemplary formulations

| Raw material | Weight % Example 1 | Example 2 | Example 3 | Example 4 | Example 5 |
|---|---|---|---|---|---|
| DEN 431 | 8.27 | — | — | — | — |
| Epikote 828 | — | 26.32 | 26.32 | 26.32 | — |
| Eponex 1510 | 11.02 | — | — | — | — |
| Epikote 1004 | — | 13.73 | 13.73 | 13.73 | |
| 1K EBSA | — | — | — | — | 94.95 |
| Amicure CG1200 | 3.36 | 5.49 | 5.49 | 5.49 | — |
| Ancamine 2014 FG | — | — | — | — | — |
| Dyhard UR500 | 1.68 | — | — | — | — |
| Amicure UR2T | — | — | 0.25 | — | — |
| Ancamine 2441 | — | — | — | 0.25 | — |
| Masterbatch EXL/828 | — | 45.76 | 45.51 | 45.51 | — |
| D-6000-DMA | 5.05 | 4.95 | 4.95 | 4.95 | 5.00 |
| KaneAce MX 257 | 27.57 | — | — | — | — |
| KaneAce MX 153 | 27.57 | — | — | — | — |
| Omnirad BDK | 0.05 | — | — | — | — |
| Irgacure 1173 | — | 1.00 | 1.00 | 1.00 | 0.05 |
| Shieldex AC-5 | 1.82 | — | — | — | — |
| MinSil SF20 | 11.21 | — | — | — | — |
| Aerosil R202 | 1.40 | 2.75 | 2.75 | 2.75 | — |
| Dynasylan GLYEO | 1.00 | — | — | — | — |

OLS Performance on Clean and Oily Contaminated Substrates

The OLS strength performance is also tested on clean steel samples and on steel samples contaminated with testing oil (3 g/$m^2$ of PL 3802-39S commercially available from Fuchs Petrolub AG, Germany).

TABLE 2

Results of the OLS Tests.

| | Example 1 | Example 5 |
|---|---|---|
| OLS on clean substrate (MPa) | 13.0 | — |
| OLS on oily contaminated substrates (MPa) | 15.8 | 19.3 |

As can be seen from the results shown in Table 2, the structural adhesives according to the present disclosure provide excellent performance and characteristics as to overlap shear strength on both clean and oily contaminated substrates. The results further show (see Example 1) the even improved OLS strength performance provided by the structural adhesives according to the present disclosure on oily contaminated substrates when compared to clean substrates.

OLS Strength Performance on Oily Contaminated Substrates with Various Thermal Curing Conditions The OLS strength performance is also tested on steel samples contaminated with testing oil (3 g/$m^2$ of PL 3802-39S commercially available from Fuchs Petrolub AG, Germany) using curable precursors of structural adhesives subjected to various thermal curing conditions:

C1: 20 minutes at 160° C. (sub-optimal curing conditions);

C2: 30 minutes at 180° C. (optimal curing conditions);

C3: 40 minutes at 200° C. (sub-optimal curing conditions).

TABLE 3

Results of the OLS Tests with various thermal curing conditions.

| | Example 2 | Example 3 | Example 4 |
|---|---|---|---|
| OLS for thermal conditions C1 (MPa) | — | 18.0 | 9.1 |
| OLS for thermal conditions C2 (MPa) | 14.4 | 18.4 | 17.0 |
| OLS for thermal conditions C3 (MPa) | — | 17.9 | 16.7 |

As can be seen from the results shown in Table 3, improved OLS strength performance is obtained when using curable compositions comprising a substituted urea-based curing accelerator for epoxides (Example 3) when compared to curable compositions not comprising any curing accelerator for epoxides (Example 2) or even when compared to using a regular polyamine-based curing accelerator for epoxide (Example 4), in particular when using sub-optimal thermal curing conditions.

T-Peel Performance

The T-Peel performance is also tested on steel samples contaminated with testing oil (3 $g/m^2$ of PL 3802-39S commercially available from Fuchs Petrolub AG, Germany).

TABLE 4

Results of the T-Peel Tests.

| | Example 5 |
|---|---|
| T-Peel on oily contaminated substrates (N) | 202 |

As can be seen from the result shown in Table 4, the structural adhesives according to the present disclosure provide excellent performance and characteristics as to T-Peel strength.

What is claimed is:

1. A curable precursor of a structural adhesive composition, comprising:

a thermally curable resin comprising epoxy functional groups;

a thermal curing initiator for the thermally curable resin, wherein the thermal curing initiator is selected from the group consisting of aliphatic amines, cycloaliphatic amines, aromatic amines, aromatic structures having one or more amino moieties, polyamines, polyamine adducts, dicyandiamides, and any combination thereof;

a radiation self-polymerizable multi-functional compound; and a free-radical polymerization initiator for the radiation self-polymerizable multi-functional compound, wherein the free-radical polymerization initiator is selected from the group consisting of Norrish type (I) free-radical polymerization initiators, Norrish type (II) free-radical polymerization initiators, and any combination thereof;

wherein the radiation self-polymerizable multi-functional compound has the following formula:

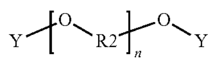

wherein:

Y is an ethylenically unsaturated group;

each R2 is independently selected from the group consisting of alkylene groups having from 2 to 6 carbon atoms; and n is an integer selected such that the calculated number average molecular weight of the radiation self-polymerizable multi-functional compound is in a range from 2000 grams per mole to 20000 grams per mole.

2. A curable precursor according to claim 1, wherein the free-radical polymerization initiator is initiated at a temperature T1, wherein the thermal curing initiator is initiated at a temperature T2, wherein the temperature T2 is greater than the temperature T1, and wherein the temperature T1 is insufficient to cause initiation of the thermal curing initiator.

3. A curable precursor according to claim 1, wherein the epoxy functional groups are glycidyl groups.

4. A curable precursor according to claim 1, wherein the amine groups present in the thermal curing initiator are selected from the group consisting of primary amine groups, secondary amine groups, and any combination thereof.

5. A curable precursor according to claim 1, which further comprises a thermal curing accelerator for the thermally curable resin, which is selected from the group consisting of polyamines, polyamine adducts, ureas, substituted urea adducts, imidazoles, imidazole salts, imidazolines, aromatic tertiary amines, and any combination thereof.

6. A curable precursor according to claim 1, wherein the free-radical polymerization initiator for the radiation self-polymerizable multi-functional compound is selected from the group consisting of benzyl ketals, hydroxy acetophenones, amino acetophenones, aryl alkyl ketones, phosphine oxides, benzoin ethers, substituted acetophenones, substituted alpha-ketols, photoactive oximes, and any combination thereof.

7. A curable precursor according to claim 1, which comprises:

from 5 to 40 wt. % of the thermally curable resin;

from 0.1 to 20 wt. % of the thermal curing initiator for the thermally curable resin;

from 0.5 to 20 wt. % of the radiation self-polymerizable multi-functional compound;

from 0.01 to 10 wt. % of the free-radical polymerization initiator for the radiation self-polymerizable multi-functional compound;

optionally, 0.05 to 10 wt. % of a thermal curing accelerator for the thermally curable resin;

optionally, a toughening agent; and optionally, a thixotropic agent;

wherein the weight percentages are based on the total weight of the curable precursor.

8. A curable precursor according to claim 1, wherein each Y is independently selected from the group consisting of a methacrylic group and a acrylic groups.

9. A curable precursor according to claim 1, wherein the thermal curing initiator for the thermally curable resin is dicyandiamide.

10. A curable precursor according to claim 1, wherein the radiation self-polymerizable multi-functional compound has the following formula:

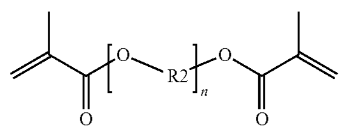

wherein:

each R2 is independently selected from the group consisting of alkylene groups having from 2 to 6 carbon atoms; and n is an integer selected such that the calculated number average molecular weight of the radiation self-polymerizable multi-functional compound is in a range from 2000 grams per mole to 20,000 grams per mole.

11. A process of manufacturing a structural adhesive article, the process comprising:

a) applying a curable precursor according to claim 1 onto a substrate using a printing technique;

b) partially curing the curable precursor by initiating the free-radical polymerization initiator for the radiation self-polymerizable multi-functional compound, thereby forming a partially cured precursor of a structural adhesive article comprising a polymeric material comprising a self-polymerization reaction product of the radiation self-polymerizable multi-functional compound;

c) optionally, substantially fully curing the partially cured precursor of a structural adhesive article by initiating the thermal curing initiator for the thermally curable resin, thereby obtaining a substantially fully cured structural adhesive article; and d) optionally, removing the partially cured precursor of a structural adhesive article or the substantially fully cured structural adhesive article from the substrate.

12. A partially cured precursor of a structural adhesive composition, comprising:

a polymeric material comprising a self-polymerization reaction product of a polymerizable material comprising a radiation self-polymerizable multi-functional compound;

optionally, some residual free-radical polymerization initiator for the radiation self-polymerizable multi-functional compound;

a thermally curable resin comprising epoxy functional groups; and a thermal curing initiator for the thermally curable resin, wherein the thermal curing initiator is selected from the group consisting of aliphatic amines, cycloaliphatic amines, aromatic amines, aromatic structures having one or more amino moieties, polyamines, polyamine adducts, dicyandiamides, and any combination thereof;

wherein the radiation self-polymerizable multi-functional compound has the following formula:

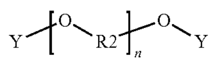

wherein:

Y is an ethylenically unsaturated group;

each R2 is independently selected from the group consisting of alkylene groups having from 2 to 6 carbon atoms; and n is an integer selected such that the calculated number average molecular weight of the radiation self-polymerizable multi-functional compound is in a range from 2000 grams per mole to 20000 grams per mole; and wherein the thermally curable resin is uncured and is embedded into the polymeric material comprising the self-polymerization reaction product of a polymerizable material comprising a radiation self-polymerizable multi-functional compound.

13. A partially cured precursor according to claim 12, wherein the epoxy functional groups are glycidyl groups.

14. A partially cured precursor according to claim 12, wherein the amine groups present in the thermal curing initiator are selected from the group consisting of primary amine groups, secondary amine groups, and any combination thereof.

15. A partially cured precursor according to claim 12, which further comprises a thermal curing accelerator for the thermally curable resin, which is selected from the group consisting of polyamines, polyamine adducts, ureas, substituted urea adducts, imidazoles, imidazole salts, imidazolines, aromatic tertiary amines, and any combination thereof.

16. A partially cured precursor according to claim 12, wherein the thermal curing initiator for the thermally curable resin is dicyandiamide.

17. The partially cured precursor according to claim 12, wherein the radiation self-polymerizable multi-functional compound has the following formula:

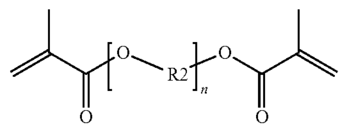

wherein:

each R2 is independently selected from the group consisting of alkylene groups having from 2 to 6 carbon atoms; and n is an integer selected such that the calculated number average molecular weight of the radiation self-polymerizable multi-functional compound is in a range from 2000 grams per mole to 20,000 grams per mole.

* * * * *